United States Patent [19]
Powell et al.

[11] 4,266,560
[45] May 12, 1981

[54] ROTOR FOR AN AXIAL FLOW COMBINE

[75] Inventors: Thomas E. Powell; Shiro T. Ito, both of Brantford, Canada

[73] Assignee: White Motor Corporation of Canada, Limited, Brantford, Canada

[21] Appl. No.: 18,679

[22] Filed: Mar. 8, 1979

[30] Foreign Application Priority Data

Jan. 12, 1979 [CA] Canada .................................. 319583

[51] Int. Cl.³ .............................................. A01F 12/18
[52] U.S. Cl. .................................... 130/27 T; 56/14.6
[58] Field of Search ........... 130/127 R, 127 T, 127 H, 130/127 HA, 127 J, 127 L, 127 N; 56/14.6

[56] References Cited
U.S. PATENT DOCUMENTS

| 752,182 | 2/1904 | Ross et al. | 130/27 T |
|---|---|---|---|
| 4,136,704 | 1/1979 | Dyke | 130/27 HA |
| 4,139,013 | 2/1979 | Hengen | 130/27 H |
| 4,148,323 | 4/1979 | McMillen et al. | 130/27 T |
| 4,178,943 | 12/1979 | West | 130/27 T |

Primary Examiner—Robert A. Hafer
Attorney, Agent, or Firm—Lockwood, Dewey, Alex & Cummings

[57] ABSTRACT

The inlet end of an axial flow rotor feeds high volumes of crop materials at low crop pressures toward the threshing and separating areas to avoid bunching of crop materials or plugging of the rotor. A cylindrical core tube at the inlet end of the rotor is of substantially reduced diameter compared to the generally cylindrical threshing or separating portions of the rotor. A frusto-conical portion connects the core tube to the threshing portion for a ramp-like transition of crop materials near the threshing area. The flighting, which is helically disposed about the core tube, feeds the materials toward special threshing elements which rise from the frusto-conical portion and a connecting portion of the core tube to a height approximately equal to that of a plurality of rasp bars affixed to the threshing portion for uniformly dispersing the crop materials against the rotor casing. The threshing elements on the frusto-conical portion have coarse protrusions which are particularly effective in removing lumps and bunches from the materials, for threshing corn, and for combing cereal grain crops into a uniform and thin mat of fast-moving crop material before threshing by the rasp bars.

5 Claims, 6 Drawing Figures

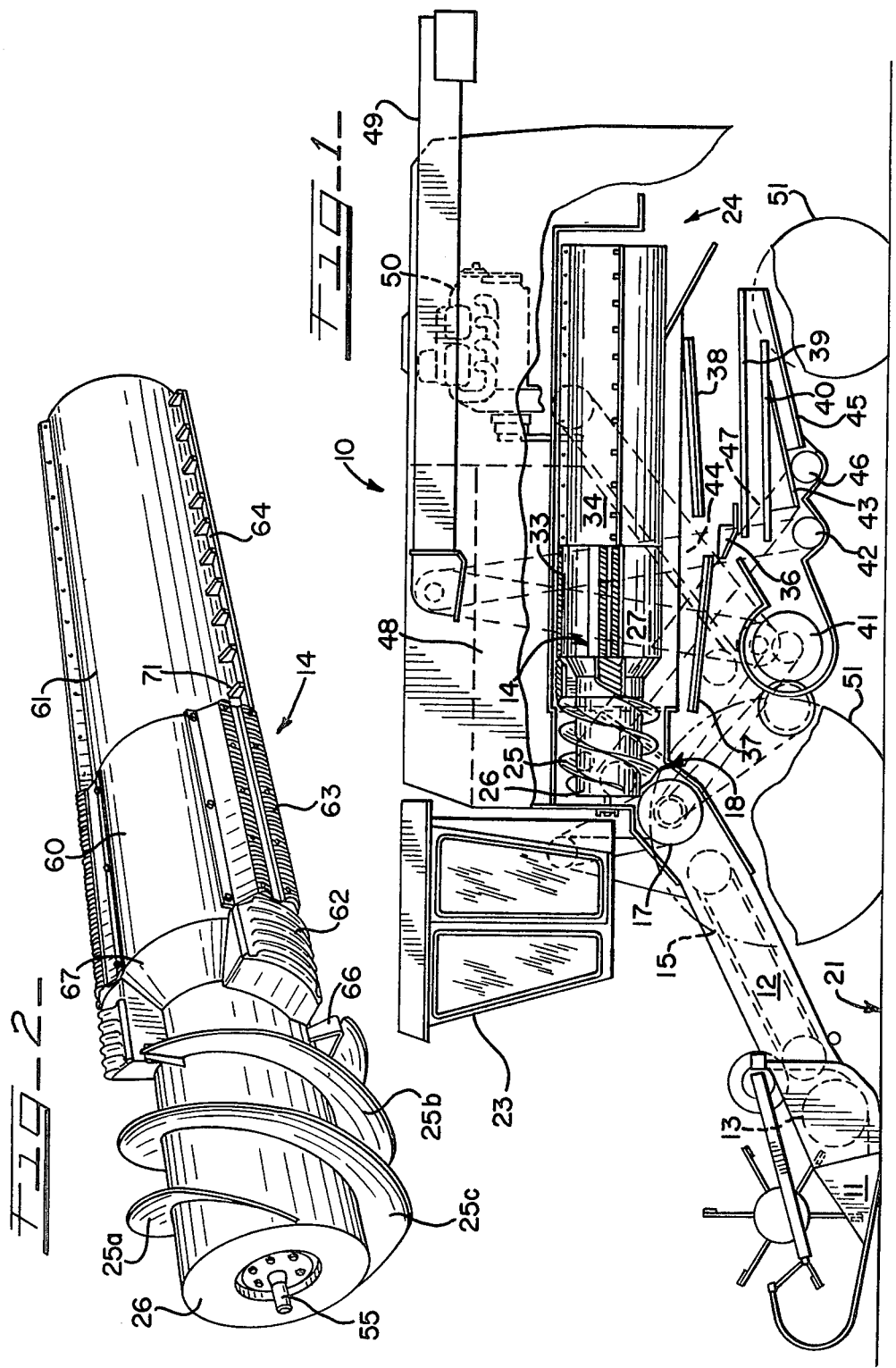

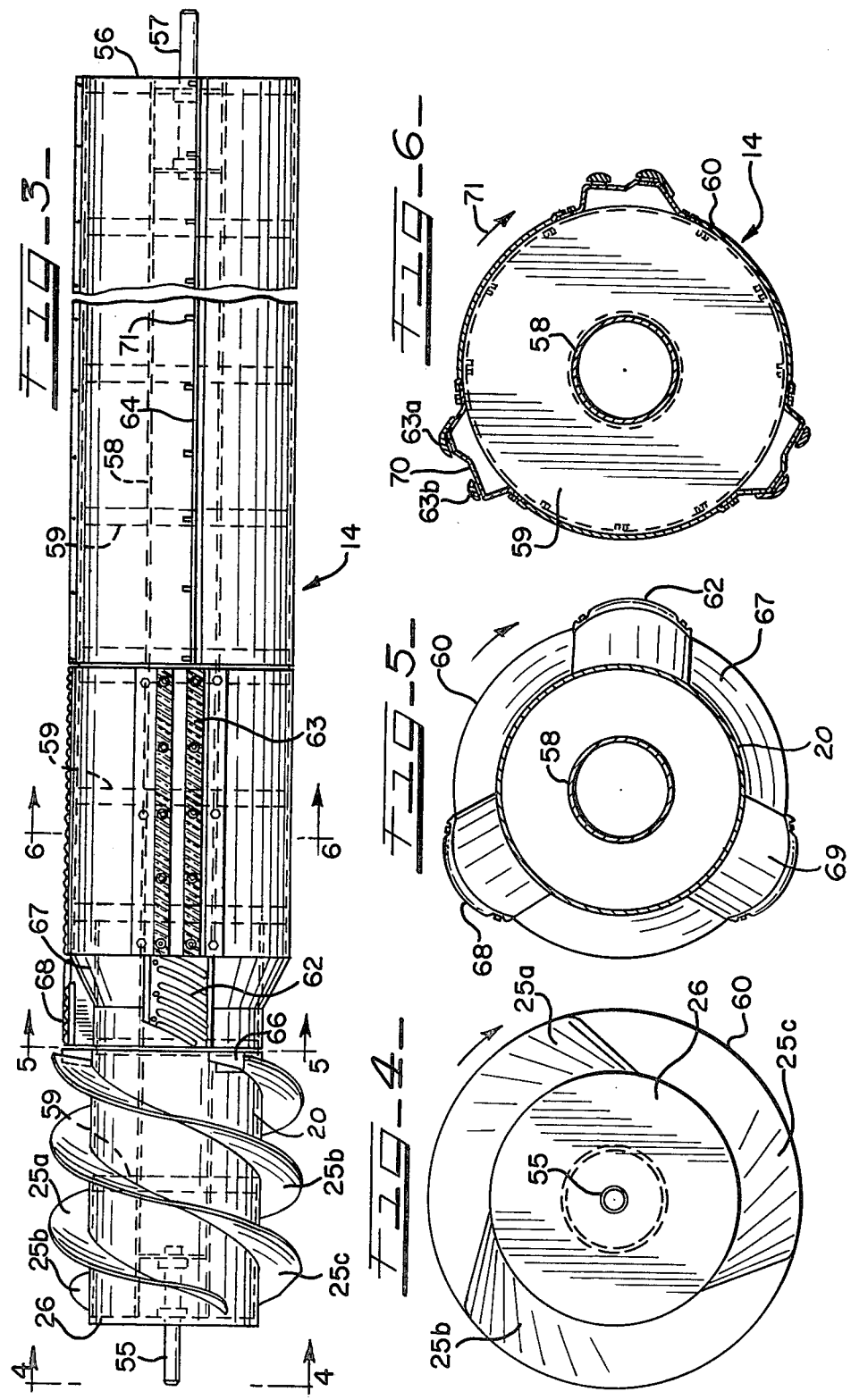

ROTOR FOR AN AXIAL FLOW COMBINE

This invention relates to an improved inlet end of a rotor in an axial flow combine for feeding high volumes of crop materials at low crop pressures to avoid bunching of crop materials or plugging of the rotor, and is more particularly concerned with a rotor having a reduced diameter core tube at the inlet end, a frusto-conical portion interconnecting the core tube with the larger diameter threshing portion of the rotor for smooth flow of crops therebetween in a ramp-like manner, flighting helically disposed about the core tube for moving crop materials toward the threshing portion, and a plurality of special threshing elements disposed about the frusto-conical portion for dispersing the crop materials against the rotor casing, the threshing elements having coarse protrusions for removing lumps and bunches from the crop materials, threshing corn or for combing cereal grain crops into a thin, fast-moving mat between the rotor and the rotor casing for threshing by the main rasp bars in the threshing area.

A number of different types of rotors for axial flow combines for harvesting various types of agricultural crops are known to the prior art. A critical problem with axial flow rotors is to change the flow of crop materials from an axial or straight line ribbon-like flow through the feeding and elevating means to an arcuate ribbon flow about the flighting on the inlet end of the rotor to a helical sleeve flow in the threshing and separating areas between the rotor and rotor casing and yet obtain uniformity in the flow of crop materials through the threshing area of the rotor without plugging or other blockage of the rotor or concave. This critical problem is solved in the present invention by feeding the straight line ribbon-like flow of crop materials into the auger flightings mounted on the rotor in the radial manner so that the flightings change the flow of crop materials to the helical sleeve flow smoothly. The ribbon-like mat of crop materials entering the inlet end of the rotor from the front beater is not abruptly changed into a helical path, but is gradually diverted into a smooth helical flow through the combined action of the feeder, the front beater, the inlet auger flighting, and the threshing elements. In this regard, it is also important to spread out the crop materials since the clearances in the threshing area between the rotor and the rotor casing are small. It is, therefore, essential that the crop materials be spread out into a thin mat of fast moving materials before reaching the rasp bars. If the crop materials are not suitably spread out, the rotor will tend to plug, thereby limiting the capacity and efficiency of the combine.

It is also important that the inlet end of the rotor provide low crop pressures between the rotor and the rotor casing to avoid bunching of materials or plugging of the rotor, as in harvesting damp windrowed crops or rice. Low crop pressures also facilitate injection of the materials from the feeder about the inlet end of the rotor. To these ends, the auger diameter of the flighting disposed about the core tube is large and the core tube is of sufficiently small diameter to accommodate the large crop volumes at low pressures without jamming. This relationship between the diameters of the auger and core tube continues until the material reaches the gradually increasing diameter of the frusto-conical portion and the special threshing elements situated on the frusto-conical portion adjacent to the threshing area. In prior art machines not so designed, crop flow is very sensitive to protuberances or slight eccentricities in areas of tight clearance, such as between the threshing and separating areas of the rotor and the rotor casing. Such protuberances, eccentricities and related problems can cause inadequate crop handling capacity and significantly higher power requirements.

In processing large volumes of crop materials at suitable crop pressure levels, it is important that the low pressure crop materials entrained between the flighting on the core tube be smoothly transferred into a dispersed, thin mat of fast-moving crop material in the threshing and separating areas of combine between the rotor and the rotor casing for enhancement of the threshing efficiency of the axial flow combine, smoother threshing and separating action with less vibration, reduction in the amount of power required by the rotor to accomplish the threshing and separating functions, and to effectively thresh damp windrowed crops or rice.

The object of the present invention, generally stated, is to provide a rotor for an axial flow combine with an inlet end designed to accept a high volume of crop materials at low crop pressures and to move the crop materials about the inlet end of the rotor into a thin and dispersed mat of fast-moving crop material at the threshing area of the axial flow rotor.

A principal object of the present invention is therefore to provide an improved inlet end of an axial flow rotor having a core tube of significantly reduced diameter in comparison to a threshing portion of the rotor, a frusto-conical portion connecting the differing diameter core tube and threshing portions of the rotor, and a plurality of special threshing elements rising from the surface of the frusto-conical portion to the same approximate diameter as the main rasp bars in the threshing portion such that high volumes of crop materials are delivered to the special threshing elements at low pressure by flighting disposed about the core tube for transformation into a thin mat of fast-moving crop material at the beginning of the threshing area and for removing lumps and bunches from the crop materials.

Another object of the present invention is to provide a rotor which has improved operating characteristics, including lower power requirements.

These objects and advantages of the invention, and others, including those inherent in the invention, are accomplished by an axial flow rotor adapted to be mounted in a generally cylindrical rotor casing including a concave in the lower portion thereof, the rotor casing extending longitudinally through the interior of an axial flow combine which harvests crop materials. The rotor includes a core tube of substantially reduced diameter at the inlet end. Flighting is helically disposed about the core tube for moving crop materials axially along the inlet end toward the threshing portion of the rotor. A frusto-conical portion connects the differing diameter core tube and threshing portion. A plurality of special threshing elements disposed about the frusto-conical portion impel the materials out of the flighting for dispersion throughout the 360 degrees of the rotor casing at the beginning of the threshing area for a smooth transition of crop materials from the low pressure about the reduced diameter core tube to the larger diameter of the threshing portion. The plurality of threshing elements, one for each flight about the inlet end of the rotor, rise from the frusto-conical portion and are provided with protrusions which are substantially coarser than the main rasp bars affixed to the surface of the threshing portion of the rotor. The threshing elements thresh coarser crops, such as corn, comb finer cereal crop materials into a thin mat for presentation to the main rasp bars, remove lumps and bunches from the crop materials, and provide improved effectiveness in threshing damp windrowed crop materials or rice.

The rotor further includes a separation portion, the separating portion having affixed thereto at spaced circumferential locations thereabout a plurality of separating elements extending longitudinally along the surface of the separating portion. The separating portion is of elongated axial dimension sufficient to extend to the discharge end of the combine. The separating portion is of approximately the same diameter as the threshing portion and the separating elements are of approximately the same height from the surface of the separating portion as the main rasp bars on the threshing portion. The separating elements preferably comprise elongated bars secured to the surface of the separating portion, the elongated bars being essentially planar and disposed at an angle to the surface of the separating portion of from 45° to 80° to impel the crop materials against the concave in the separating portion.

The features of the present invention, which are believed to be novel and patentable, are set forth with particularity in the appended claims. The invention, together with the further advantages thereof can best be understood by reference to the following description taken in conjunction with the accompanying drawings, in which like reference numerals identify like elements, and in which:

FIG. 1 is a partly broken away side elevational view illustrating the general physical arrangement of an axial flow combine in accordance with the present invention wherein a special rotor is longitudinally and co-axially disposed in a rotor casing, including a concave, between an inlet transition area and an exhaust area;

FIG. 2 is a perspective view of the rotor of the axial flow combine of FIG. 1 illustrating flighting about a reduced diameter core tube at the inlet end and terminating near special threshing elements disposed about a frusto-conical portion leading to a tube of larger diameter in the threshing area which is followed by the separating and discharge ends of the rotor;

FIG. 3 is a side elevational view of the rotor of FIG. 2 further illustrating internal structural details in dashed lines;

FIG. 4 is an elevational view of the inlet end of the rotor of FIG. 3 taken substantially along the line 4—4;

FIG. 5 is a sectional view taken on line 5—5 in FIG. 3 further illustrating the special threshing elements; and FIG. 6 is a sectional view taken on line 6—6 in FIG. 3 further illustrating the threshing area of the rotor.

Referring to FIG. 1, there is shown a crop harvesting combine, generally designated 10, of the axial flow type. A front portion of a header 11 floats along the soil surface 21 to sever crops close to the ground. Different headers may be provided for different types of crops, such as corn headers, pickup headers or straight cut headers. A feeder 12 conveys the crop materials from a header auger 13 to an axial flow rotor 14. Elevating and conveying means 15 disposed in the feeder 12 convey crop materials from the header to the rotor 14. The elevating and conveying means 15 operates at a sufficient velocity to adequately move the maximum anticipated crop volume from the auger 13 through the feeder 12. An inlet beater 17 rotates at a higher tangential velocity than the elevating and conveying means 15 to accelerate the crop materials for delivery into an inlet transition area 18. The feeder 12 is removably mounted to the combine near the axis of the beater 17 by a hinge-like and pivotal connection which permits the header 11 to have a floating action to conform to variations in the soil surface 21.

Generally disposed about the feeder 12 is a windowed cab 23 containing various operating controls (not shown) for observing and controlling the crop harvesting operation of the combine 10.

The rotor 14 is longitudinally and horizontally disposed in the combine 10 and is of sufficient axial dimension to extend from the inlet transition area 18 to a discharge area 24 at the rear of the combine 10. The flow of crop materials gradually changes in the inlet transition area 18 from axial or a straight ribbon-like flow through the feeder 12 to an arcuate ribbon-like flow about the flighting 25 to a helical sleeve-like flow about the longitudinal axis of the rotor 14. Helical flighting 25 is disposed about a reduced diameter core tube 20 at the inlet end 26 of the rotor 14 to entrain crop materials therebetween and begin the helical movement about the rotor. The crop materials are delivered by the flighting 25 to a threshing area 27 whereat a plurality of threshing elements, as will be discussed in more detail hereinafter, cause the crop materials to undergo shear and impact forces between the threshing elements and the concave of the rotor casing 33. Guide vanes (not shown) are helically disposed in relation to the longitudinal axis of the rotor 14 about the top interior of the rotor casing 33 to cause progressive rearward movement of the crop materials axially along the rotor 14.

Upon movement of the crop materials into the separation area 34, the materials are subjected to a mixing and separating action between the rotor 14 and the rotor casing 33. Grain or the like from the threshing area 27 falls to an oscillating grain pan 37 and grain or the like from the separating area 34 falls to an oscillating separating pan 38 with the pans 37, 38 in cascading relationship to a pair of cascading chaffer pans 36, 39 and a sieve pan 40. A blower 41 provides a source of air flow to aid in the chaffing and sieving operations such that clean grain is delivered to a grain auger 42 by an inclined grain pan 43 disposed below a portion of the sieve pan 40. Mixed grain or other crop component materials are delivered by another inclined pan 45, generally disposed below portions of the chaffer pan 39 and the sieve pan 40, to a separation auger 46 for return to the inlet transition area 18 by means of an elevator 47 for rethreshing of the mixed materials by the rotor 14. The grain auger 42 delivers clean grain through an elevator 44 to a saddle-type grain tank 48 disposed along both sides of the rotor 14 for temporary storage of grain in the combine 10 or for discharge of the grain from the combine through a discharge duct 49.

An internal combustion engine 50 disposed near the rear of the combine near the rotor casing 33 provides the motive power for the various moving elements of the combine 10 including at least a pair of the wheels 51.

With reference to FIGS. 2-6, the rotor 14 of the present invention is illustrated in further detail. The inlet end 26 has a shaft 55 secured thereto substantially along the longitudinal axis of the rotor 14. The discharge end 56 of the rotor 14 likewise has a shaft 57 secured to the discharge end 56 substantially along the longitudinal axis of the rotor 14 with the end of shaft 57 splined for supplying drive power to the rotor 14 for rotation of the rotor 14 in the rotor casing 33 of the combine 10. An internal cylinder 58 (FIG. 3) extends longitudinally through the rotor 14 between the inlet end 26 and the discharge end 56. The shafts 55, 57 each extend internally into the rotor 14 for further securement to the inside to the cylinder 58. A plurality of annular discs 59 (FIG. 3) are disposed at spaced points along the cylinder 58 for supporting the exterior surfaces of the various portions of the rotor 14, as discussed hereinafter.

The core tube 20 at the inlet end 26 is of substantially reduced diametric dimension as compared to most of the rotor 14. For example, the core tube 20 may have a diameter of about 19.5 inches while the threshing portion 60 and separating portion 61 each have a diameter of approximately 26.0 inches. In accordance with the present invention, the diameter of the core tube 20 must be less than 75% of the diameter of the threshing portion 60 or the separating portion 61 such that substantial volumes of crop material may be entrained at low crop pressures about the flights 25 helically disposed about the core tube 20 for axial movement rearwardly along the rotor 14. The reduced diameter of the core tube 20 continues into the beginning of the threshing area 27 of the combine 10 to keep crop pressures in the inlet end low to avoid plugging of the rotor 14 or similar problems. Since the rotor casing 33 is of substantially uniform diameter, the flighting 25 about the core tube 20 may typically have a depth of about 5 inches.

As best can be seen in FIG. 4, the number of flights 25 is identical to the number of threshing elements 62, the number of sets of main rasp bars 63 and the number of separating elements 64 disposed on corresponding portions of the rotor 14. In the preferred embodiment of the rotor 14 as illustrated in FIGS. 2-6, three separate flights 25a, 25b, 25c are provided about the inlet end 26. Lead ends of the flighting 25a, 25b, 25c are tapered as illustrated in FIGS. 1 and 4 to define a frusto-conical surface of revolution which permits closer placement of the inlet beater 17 to the rotor 14 for entraining crop materials about all portions of the flighting 25. Terminal ends of the flighting 25a, 25b, 25c terminate against and are supported by brackets 66 which are in the shape of an inverted "V".

The threshing elements 62 are located about a frusto-conical portion 67 which mates the differing diameters of the core tube 20 and the threshing portion 60. The threshing elements 62 also extend over a portion of the core tube 20 adjacent to the frusto-conical portion 67 and which is not encompassed by the flights 25. Each of the threshing elements 62 project by means of upright sidewalls 69 from the frusto-conical portion 67 and the core tube 20 to approximately the same height from the surface of the rotor 14 as the main rasp bars 63 and the separating elements 64. The threshing elements 62 are provided with a plurality of coarse teeth or protrusions 68 (FIG. 3) which are helically disposed in about a 30° angle to a transverse cross section of the rotor 14 while the flighting 25 defines about an 18° angle therewith. The threshing elements 62 are particularly adapted to thresh coarse crops, such as corn, and to comb finer cereal type grains into a dispersed and thin mat before further advancement of the crop materials into the reduced clearances between the threshing portion 60 of the rotor 14 and the concave of the rotor casing 33. The combing action provides an improved uniformity of crop materials for more efficient threshing action by the threshing portion 60 and the separating portion 61. The threshing elements 62 are also effective in removing lumps and bunches from the materials and provide improved threshing capabilities for damp windrowed crops or rice. The special threshing elements 62 and the frusto-conical portion 67 disperse the crop materials throughout 360 degrees of the rotor casing 33, thereby impelling the crop materials against the guide vanes and concave of the rotor casing 33 to begin threshing of grain therefrom. Jamming of the rotor 14 is avoided since the crop materials are under low pressures in the flighting 25 before the guide vanes begin to promote a helical sleeve movement through the threshing area 27 and the separating area 34. The upstanding sidewalls 69 of the special threshing elements 62, in combination with the frusto-conical portion 67 and the centrifugal forces imparted to the crop materials by the rotor 14, act upon and impel the crop materials out of the flighting 25 and into the threshing area 27.

The teeth or protrusions 68 on the threshing elements 62 must be carefully dimensioned and positioned to obtain satisfactory operation. The protrusions 68 should rise approximately $\frac{1}{2}$ inch above the surface of the threshing element 62 to adequately achieve the combing and threshing functions hereinbefore described. Protrusion heights substantially less than $\frac{1}{2}$ inch will result in inadequate threshing action while protrusion heights substantially greater than $\frac{1}{2}$ inch will cause jamming of the crop materials under certain crop conditions. The helical angle at which the protrusions 68 are disposed is also of considerable importance. Preferably the protrusions 68, which define circumferential segments of a circle, form an angle of approximately 30 degrees to a transverse cross-section of the rotor 14 such as to the line 5—5 in FIG. 3. If the angle is less than 27 degrees, the threshing elements 62 will not apply sufficient shear forces to the crop materials. If the angle is greater than 35 degrees, the crop materials will be prone to wedging under certain crop conditions.

Upon advancement of the crop materials to the threshing portion 60, grain is threshed from the crop materials by shear and impact forces of the main rasp bars 63 against the concave of the rotor casing 33. As shown in FIG. 6, rasp bar supporting brackets 70 project from the surface of the threshing portions 60 for supporting a leading main rasp bar 63a and a trailing main rasp bar 63b. Each of the rasp bars 63a, 63b are provided with a plurality of fine rasps for threshing the crop materials. Rotation of the rotor 14 is in the direction indicated by the arrow 71. The rasp bars 63 extend longitudinally along the threshing surface 60 from the threshing elements 62 and corresponding separating elements 64. The supporting bracket 70 is secured to threshing portion 60, as by welding, and the rasp bars 63a, 63b are threadedly secured to the supporting brackets 70.

As the crop materials continue to move axially along the rotor 14, the crop materials enter about the separating portion 61. The separating portion 61 is of longer dimension axially along the rotor 14 such that the rotor 14 extends into the discharge area 24 of the combine 10 for discharge of the threshed crop materials directly from the discharge end 56 of the rotor 14. A plurality of separating elements 64, equal in number to the sets of rasp bars 63, extend longitudinally along the separating portion 61 from ends of the rasp bars 63. The separating elements are threadedly secured to a plurality of members 72 which are in turn secured to the separating portion 61. The separating elements 64 typically comprise an elongated bar which is disposed to the separating portion 61 at an angle of between 45° and 80°. Each separating element 64 applies centrifugal forces to the crop materials for additional separation of the threshed grain remaining among the crop materials.

While particular embodiments of the invention have been shown and described, it will be obvious to those skilled in the art that changes and modifications may be made without departing from the invention in its broader aspects, and, therefore, the aim of the appended claims is to cover all such changes and modifications as fall within the true spirit and scope of the invention.

We claim:

1. An axial flow combine rotor adapted to be mounted co-axially in a generally cylindrical rotor casing including a concave in the lower portion thereof, said rotor comprising:

a generally cylindrical core tube;

flighting helically disposed about said core tube at an inlet end for moving crop materials at low crop pressures axially along said inlet end between the core tube and the rotor casing;

a generally cylindrical threshing portion of larger diametric dimension than said core tube;

threshing rasp bars affixed to said threshing portion of the rotor at circumferentially spaced locations thereabout to project from the surface of said threshing portions, said rasp bars adapted for threshing the crop materials against the concave of the rotor casing;

a plurality of threshing elements rising from said core tube adjacent a threshing area of said rotor casing, said threshing elements defining a diameter approximate to that of the rasp bars said threshing elements adapted to thresh coarse crop materials such as ears of corn or to comb finer cereal grains into a mat prior to threshing by the rasp bars; and a frusto-conical portion disposed between said core tube and said threshing portion, wherein at least a portion of said threshing elements is disposed on said frusto-conical portion.

2. The axial flow combine rotor as in claim 1 wherein said threshing elements comprise upstanding sidewalls adapted to impel crop materials from the flighting throughout 360 degrees against the rotor casing into a thin and dispersed mat, and a plurality of coarse, helically disposed projections at an upper surface of said threshing elements adapted to thresh or comb said crop materials prior to threshing by the rasp bars of the threshing portion of the rotor.

3. The rotor as in claim 1 wherein the flighting about said inlet end of the rotor is tapered at the inlet end of the rotor to define a frusto-conical surface of revolution for closer placement of the feeding means to the rotor for feeding crop materials at low crop pressures about all portions of the flighting of the rotor.

4. A rotor as in claim 1 wherein said threshing portion has the same number of rasp bars as threshing elements, said rasp bars being located adjacent a corresponding threshing element.

5. The rotor as in claim 1 wherein said rotor further comprises a separating portion, said separating portion having affixed thereto at spaced circumferential locations a plurality of separating elements extending longitudinally along the surface of said separating portion, said separating portion being of sufficient axial length to extend to a discharge area of the combine.

* * * * *